United States Patent
Cai et al.

(10) Patent No.: US 9,848,091 B2
(45) Date of Patent: Dec. 19, 2017

(54) INTERIM BILLING FOR SESSIONS IN IMS NETWORKS

(75) Inventors: Yigang Cai, Naperville, IL (US); Ranjan Sharma, New Albany, OH (US); Shengqiang Wang, Cary, NC (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1702 days.

(21) Appl. No.: 12/418,206

(22) Filed: Apr. 3, 2009

(65) Prior Publication Data

US 2010/0257077 A1   Oct. 7, 2010

(51) Int. Cl.
| | |
|---|---|
| *H04M 15/00* | (2006.01) |
| *G06Q 30/04* | (2012.01) |
| *H04L 12/14* | (2006.01) |

(52) U.S. Cl.
CPC ............ *H04M 15/82* (2013.01); *G06Q 30/04* (2013.01); *H04L 12/14* (2013.01); *H04L 12/1403* (2013.01); *H04M 15/00* (2013.01); *H04M 15/41* (2013.01); *H04M 15/57* (2013.01); *H04M 15/8228* (2013.01); *H04M 2215/208* (2013.01); *H04M 2215/78* (2013.01); *H04M 2215/7833* (2013.01)

(58) Field of Classification Search
None
See application file for complete search history.

(56) References Cited

U.S. PATENT DOCUMENTS

| | | | | |
|---|---|---|---|---|
| 6,023,499 A | * | 2/2000 | Mansey et al. | ........ 379/111 |
| 6,330,312 B1 | * | 12/2001 | Wright et al. | ....... 379/112.06 |
| 2006/0258331 A1 | * | 11/2006 | Syrett et al. | ......... 455/405 |

* cited by examiner

*Primary Examiner* — F. Zeender
*Assistant Examiner* — Denisse Ortiz Roman
(74) *Attorney, Agent, or Firm* — Duft Bornsen & Fettig, LLP

(57) ABSTRACT

Charging systems and associated methods are disclosed that provide interim billing for a session in an IMS network. The charging system includes a charging data system that receives accounting messages from network elements serving the session in the IMS network, and generates partial CDRs for each network element based on the accounting messages. The charging data system also sets an aggregation/correlation timer. Responsive to an expiration of the aggregation/correlation timer, the charging data system aggregates the partial CDRs for each network element to generate an aggregated CDR for each network element. The charging system further includes a charging gateway system that, in further response to the expiration of the aggregation/correlation timer, correlates the aggregated CDRs to generate an interim consolidated CDR for the session, and transmits the interim consolidated CDR to a billing system. The billing system may then provide interim billing for the session based on the interim consolidated CDR.

20 Claims, 4 Drawing Sheets

INTERIM BILLING FOR SESSIONS IN IMS NETWORKS

BACKGROUND

1. Field of the Invention

The invention is related to the field of communications and, in particular, to billing for sessions in IMS networks.

2. Statement of the Problem

One type of communication network gaining popularity is an IP Multimedia Subsystem (IMS) network. As set forth in the 3$^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

To provide offline charging for a session in an IMS network, network elements in the IMS network, such as a Call Session Control Function (S-CSCF, P-CSCF, I-CSCF), an application server (AS), a Media Gateway Control Function (MGCF), etc, generate Diameter Accounting Requests (ACR) for the session. When first being involved in the session, the network elements generate ACR[Start] messages. For example, if an S-CSCF receives a SIP INVITE to initiate the session, then the S-CSCF generates an ACR [Start] message. The network elements then transmit the ACR[Start] messages to a Charging Data Function (CDF).

After the session is established, the network elements periodically transmit ACR[Interim] messages to the CDF. The network elements transmit the ACR[Interim] messages to the CDF according to a pre-defined interval, such as every five minutes, or upon a change in the service or media. The service or media change can occur at any time in the session, in contrast to the periodic "heartbeat" mechanism driven by a timer set at a pre-defined interval. If the network elements detect that the session ends, such as by receiving a SIP BYE message, then the network elements generate ACR[Stop] messages. The network elements then transmit the ACR [Stop] messages to the CDF.

When the CDF first receives the ACR[Start] message from a network element, the CDF opens a Charging Data Record (CDR) for the session for that network element. The CDF then updates the open CDR each time it receives an ACR[Interim] message from the network element based on the charging information in the ACR[Interim] message. If the CDF receives an ACR[Stop] message from the network element, then the CDF closes the CDR for the session for that network element.

There may be instances where the CDF generates a partial CDR for a network element. When the CDF first receives the ACR[Start] message from a network element, the CDF sets a timer. If the CDF receives an ACR[Stop] message from the network element before expiration of the timer, then the CDF closes the CDR for the session to generate a full CDR. If the CDF does not receive an ACR[Stop] message from the network element before expiration of the timer, then the CDF closes the CDR to generate a partial CDR for the session. The CDF then opens a new CDR for the session. The CDF will continue to generate partial CDRs until an ACR[Stop] message is received from the network element. Also, if the CDF receives an ACR[Interim] message that indicates a service or media change for the session, then the CDF closes the CDR to generate a partial CDR for the session.

At some point at the end of the session, the CDRs for the session are aggregated and correlated to be presented to a billing system. Some existing IMS telecommunication systems presently define that the trigger for aggregation and correlation is the receipt of an ACR[Stop] message from the S-CSCF. Thus, in response to receiving the ACR[Stop] message from the S-CSCF, the CDF aggregates the partial CDRs for each network element (if any). The CDF then transmits the aggregated CDRs and the full CDRs for all of the network elements for correlation purposes. The correlation function correlates the CDRs for all of the network elements that served the session according to an IMS Charging Identifier (ICID), and generates a consolidated CDR for the session. In some circumstances, the CDF will correlate CDRs before transmitting them to the CGF; if so, the CDF should transmit the consolidated CDR to the CGF. In some other implementations, the functionality of correlation resides with the CGF. However, for the purposes of this disclosure, the exact location of this functionality execution does not have a material impact. The consolidated CDR thus includes the charging information for each of the network elements that served the session. The CGF then transmits the consolidated CDR to the billing system, which provides billing for the session. The billing system thus receives a single consolidated CDR from the CGF.

IMS networks and other multimedia/data type networks provide new and different issues not typically seen with traditional circuit-based networks. One such issue is long duration sessions. In a traditional circuit-based network, a typical voice call is relatively short, on the order of ten minutes or less. In an IMS network, data sessions for surfing the Internet, for watching IP TV, for playing online gaming, etc, may last much longer than a traditional voice call. For example, an online gaming session may last for multiple days. When long duration sessions are established over an IMS network, there may be problems associated with charging for the sessions. A consolidated CDR for a session is not generated until the session has ended. If a session is active for multiple days or even weeks, the session may extend beyond a billing period boundary, such as the end of a month. Because the consolidated CDR for the session is not generated until the session has ended, the session will not be billed until the next billing period which delays the time in which a service provider receives payment for the session. Also, if the CDF or CGF would happen to encounter a failure during the long duration session, then a consolidated CDR would not be sent to the billing system. Thus, the session would not be billed, and the service provider would lose the revenue for the entire session.

Additionally, partial CDRs created upon expiration of a timer, or change in service or media are not presented to the billing system as-is. They are aggregated, on a per network element basis, and correlated, on a session basis, before being presented to the billing system. Therefore, a periodic generation of partial CDRs alone is not useful for billing purposes until these partial CDRs can be formatted and presented to the billing system.

SUMMARY

Embodiments described herein perform aggregation and correlation during the session based on an aggregation/ correlation timer. By performing aggregation and correlation during the session, interim consolidated CDRs may be generated during the session, which are provided to the billing system. The billing system may then bill for the session before the session actually ends. Thus, even if a long duration session extends beyond a month boundary of a billing period, the billing system is able to bill for the part of the session that occurred during the billing period. Also, if the charging function happens to fail, then the billing system would be able to bill for part of the session so that the service provider does not lose the entire revenue for the session.

In one embodiment, a charging system is connected to an IMS network to support interim billing for sessions in the IMS network. The charging system includes a charging data system operable to receive accounting messages from network elements serving the session in the IMS network, and to generate partial CDRs for each network element based on the accounting messages. The charging data system is further operable to set an aggregation/correlation timer. Responsive to an expiration of the aggregation/correlation timer, the charging data system is further operable to aggregate the partial CDRs for each network element to generate an aggregated CDR for each network element.

The charging system further includes a charging gateway system operable to receive the aggregated CDR for each network element from the charging data system. In further response to the expiration of the aggregation/correlation timer, the charging gateway system is operable to correlate the aggregated CDRs to generate an interim consolidated CDR for the session, and to transmit the interim consolidated CDR to a billing system. The billing system may then bill for part of the session based on the interim consolidated CDR even though the session has not ended. The charging system continues to perform aggregation and correlation responsive to the expiration of the aggregation/correlation timer until the session ends.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended aid in understanding the principles of the invention, and are to be construed as being without limitation to such specifically recited examples and conditions. As a result, the invention is not limited to the specific embodiments or examples described below, but by the claims and their equivalents.

Figure 1:
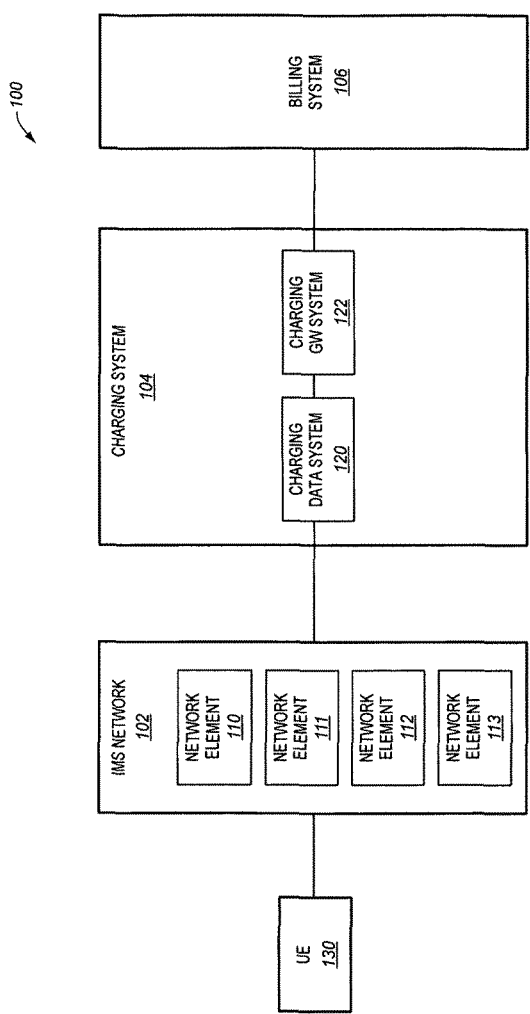
FIG. 1 illustrates a communication network in an exemplary embodiment.

FIG. 1 illustrates a communication network 100 in an exemplary embodiment. Communication network 100 includes an IMS network 102, a charging system 104, and a billing system 106. IMS network 102 includes a plurality of network elements 110-113. Network elements 110-113 comprise any systems, servers, or functions operable to serve a session or provide a service for a session (also referred to as a call) within IMS network 102. For example, network element 110 may comprise a Serving-Call Session Control Function (S-CSCF), network element 111 may comprise an Interrogate-Call Session Control Function (I-CSCF), network element 112 may comprise a Media Gateway Control Function (MGCF), and network element 113 may comprise an application server (AS). Although four network elements 110-113 are shown, those skilled in the art will appreciate that IMS network 102 may include more or less network elements.

Charging system 104 comprises any system, server, or function operable to receive accounting messages from network elements 110-113, and to generate a consolidated Charging Data Record (CDR) for sessions within IMS network 102. For example, charging system 104 may comprise a Charging Data Function (CDF)/Charging Gateway Function (CGF) as defined by the 3GPP in Release 6, or a Charging Collector Function (CCF) as defined by the 3GPP in Release 5. Charging system 104 includes a charging data system 120 and a charging gateway system 122. Charging data system 120 comprises any system, server, or function operable to receive accounting messages, such as Diameter Accounting Requests (ACR), and to generate CDRs based on the accounting messages. Charging gateway system 122 comprises any system, server, or function operable to correlate CDRs for a session to generate a consolidated CDR for the session.

Billing system 106 comprises any system, server, or function operable to receive a consolidated CDR for a session, and to bill a customer for the session based on the consolidated CDR. Communication network 100 may include other networks, systems, or devices not shown in FIG. 1, such as additional network elements, additional charging data systems, additional charging gateway systems, etc.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Assume for this embodiment that one or more of network elements 110-113 serves a session involving user equipment (UE) 130. Further assume that each network element 110-113 includes a Charging Trigger Function (CTF) that generates accounting messages while serving the session. An accounting message comprises any charging message that includes information used to bill for a session. For instance, at the beginning of the session, a network element 110 may generate an initial accounting message, and transmit the initial accounting message to charging data system 120. One example of an initial accounting message is a Diameter ACR[Start] message. During the session, network element 110 may periodically generate interim accounting messages based on a predefined timer, and transmit the interim accounting messages to charging data system 120. One example of an interim accounting message is a Diameter ACR[Interim] message. At the end of the session, network element 110 may generate a stop accounting message, and transmit the stop accounting message to charging data system 120. One example of a stop accounting message is a Diameter ACR[Stop] message.

The following embodiments illustrate how charging system 104 operates to perform charging for a session in IMS network 102. More particularly, when the session comprises a long duration session, then charging system 104 is able to generate interim consolidated CDRs for the session, and provide the interim consolidated CDRs to billing system 106. By receiving the interim consolidated CDRs, billing system 106 does not need to wait until the end of the session to bill for the session, which is an advantage for long duration sessions.

Figure 2:
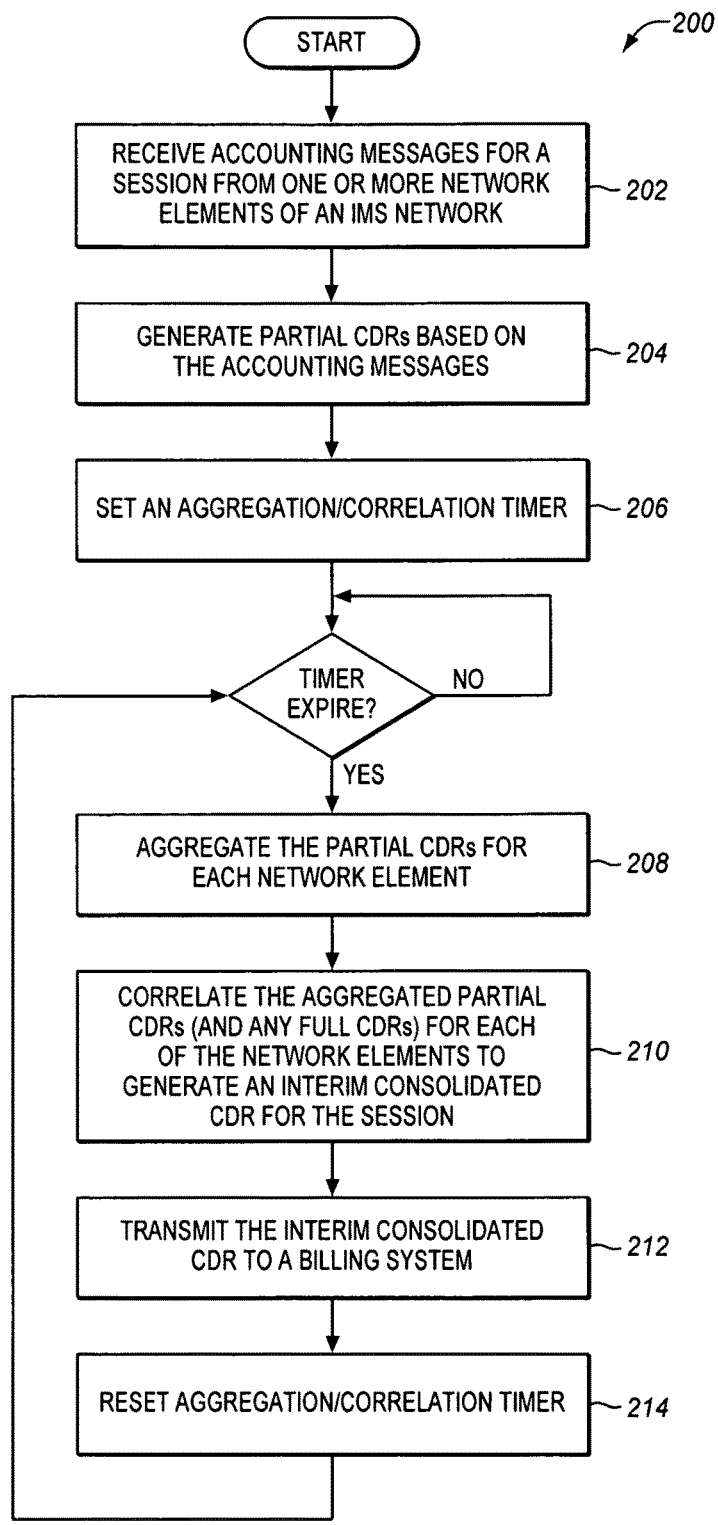
FIG. 2 is a flow chart illustrating a method of generating interim consolidated CDRs in an exemplary embodiment.

FIG. 2 is a flow chart illustrating a method 200 of generating interim consolidated CDRs in an exemplary embodiment. The steps of method 200 will be described with reference to communication network 100 in FIG. 1, but those skilled in the art will appreciate that method 200 may be performed in other networks. Also, the steps of the flow chart in FIG. 2 are not all inclusive and may include other steps not shown, and the steps may be performed in an alternative order.

In step 202, charging data system 120 receives accounting messages for the session from one or more of network elements 110-113. For example, charging data system 120 may receive a start accounting message, and one or more interim accounting messages from network element 110. In response to the start accounting message, charging data system 120 opens a CDR for the session for network element 110. Charging data system 120 also sets a first timer, which indicates when a partial CDR is generated. The first timer is referred to herein as a partial CDR timer. If charging data system 120 does not receive a stop accounting message from network element 110 before expiration of the partial CDR timer, then charging data system 120 closes the CDR. A CDR that is closed responsive to the expiration of the partial CDR timer is referred to as a partial CDR as it does not include all of the information for the session. Charging data system 120 then resets the partial CDR timer. Charging data system 120 will continue to periodically generate partial CDRs upon expiration of the partial CDR timer until a stop accounting message is received from network element 110.

Also, if charging data system 120 receives an interim accounting message that indicates a service or media change for the session, then charging data system 120 will close the CDR to generate a partial CDR. Charging data system 120 operates in a similar manner to generate partial CDRs for other network elements 111-113. The operation of generating partial CDRs responsive to the expiration of the partial CDR timer or responsive to a service or media change is generally indicated in FIG. 2 as step 204.

In step 206, charging data system 120 also sets a second timer. The second timer is referred to herein as an aggregation/correlation timer. The aggregation/correlation timer is used as a pseudo-trigger for aggregation and correlation within charging system 104 during the session, when the session has exceeded a certain configurable time period. Aggregation refers to the operation performed to identify the partial CDRs for a network element for a session, and group the partial CDRs together. Correlation refers to the operation performed to identify the full and partial CDRs for each network element that served the session, and to combine the CDRs to generate a consolidated CDR. Traditionally, aggregation and correlation was performed only at the end of the session. More particularly, when a charging system received a stop accounting message from an S-CSCF, then the charging system would perform aggregation and correlation. In charging system 104, the aggregation/correlation timer triggers aggregation and correlation within charging system 104 prior to the end of the session.

Charging data system 120 then monitors the aggregation/correlation timer while receiving new accounting messages, and generating new partial CDRs. Responsive to the expiration of the aggregation/correlation timer, charging data system 120 aggregates the partial CDRs for each network element 110-113 in step 208. Charging data system 120 then transmits the aggregated partial CDRs to charging gateway system 122. Those skilled in the art will appreciate that one or more network elements 110-113 may generate a full CDR for the session instead of partial CDRs. Charging data system 120 will also transmit any full CDRs for the session to charging gateway system 122. Charging gateway system 122 then receives the CDRs from charging data system 120, and stores the CDRs.

At some point after receiving the aggregated partial CDRs and the full CDRs, charging gateway system 122 correlates the aggregated partial CDRs and full CDRs for each of network elements 110-113 to generate an interim consolidated CDR for the session in step 210. Charging gateway system 122 may monitor the aggregation/correlation timer, and initiate correlation after a threshold time period following expiration of the aggregation/correlation timer. The delay after expiration of the aggregation/correlation timer is to ensure that charging gateway system 122 receives all of the CDRs. For example, charging gateway system 122 may wait two minutes after expiration of the aggregation/correlation timer before initiating correlation.

The interim consolidated CDR includes charging information for part of the session, not the entire session. Charging gateway system 122 may insert an interim indicator in the interim consolidated CDR to indicate to billing system 106 that this is not the final consolidated CDR and that there will be additional consolidated CDRs for the session. For example, charging gateway system 122 may insert a flag or indicator in the consolidated CDR, such as "interim" or "continued". Charging gateway system 122 then transmits the interim consolidated CDR to billing system 106 in step 212. Based on the interim consolidated CDR, billing system 106 may generate a bill for part of the session, if desired.

Charging data system 120 resets the aggregation/correlation timer in step 214. Based on the aggregation/correlation timer, charging data system 120 continues to periodically aggregate partial CDRs before the session ends. Also, charging gateway system 122 continues to periodically correlate CDRs before the session ends to generate an interim consolidated CDR. When the session does finally end, charging data system 120 and charging gateway system 122 perform aggregation and correlation a final time for the session as is illustrated in FIG. 3.

Figure 3:
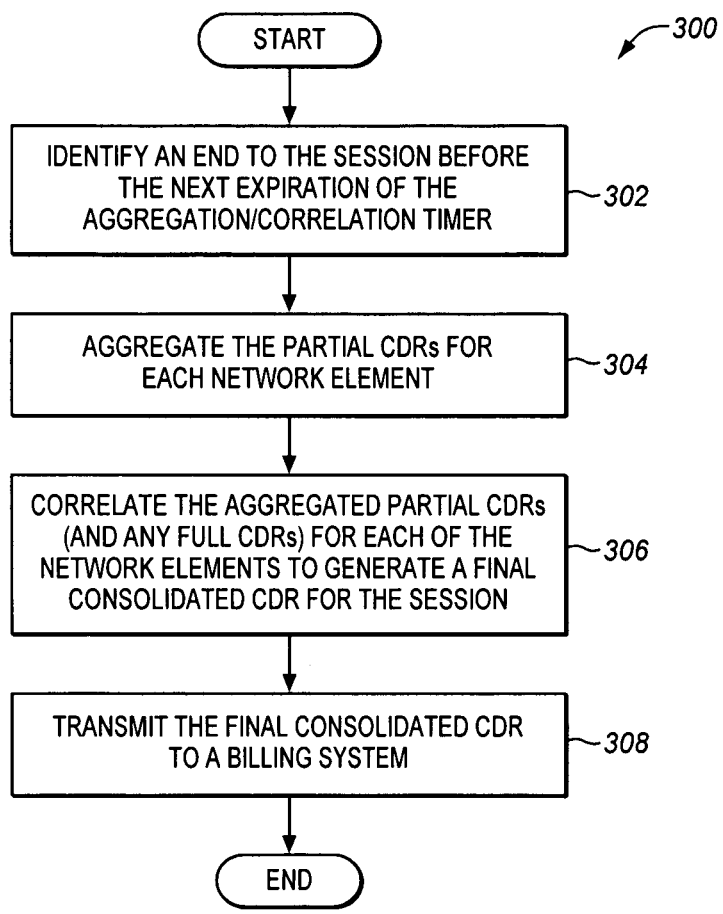
FIG. 3 is a flow chart illustrating a method of generating a final consolidated CDR in an exemplary embodiment.

FIG. 3 is a flow chart illustrating a method 300 of generating a final consolidated CDR in an exemplary embodiment. The steps of method 300 will be described with reference to communication network 100 in FIG. 1, but those skilled in the art will appreciate that method 300 may be performed in other networks. Also, the steps of the flow chart in FIG. 3 are not all inclusive and may include other steps not shown, and the steps may be performed in an alternative order.

In step 302, charging data system 120 identifies an end to the session before the next expiration of the aggregation/correlation timer. To identify the end of the session, charging data system 120 may receive a stop accounting message from one of network elements 110-113. For example, if charging data system 120 receives an ACR[Stop] from an S-CSCF (not shown) in IMS network 102, then charging data system 120 may identify the end of the session. In response to detecting the end of the session, charging data system 120 aggregates the partial CDRs for each network element 110-113 in step 304. Charging data system 120 then transmits the aggregated partial CDRs to charging gateway system 122. Those skilled in the art will appreciate that one or more network element 110-113 may generate a full CDR for the session instead of partial CDRs. Charging data system 120 will also transmit any full CDRs for the session to charging gateway system 122.

Also in response to the end of the session, charging gateway system 122 correlates the partial CDRs and full CDRs for each of network elements 110-113 to generate a final consolidated CDR for the session in step 306. Charging gateway system 122 may insert a final indicator in the final consolidated CDR to indicate to billing system 206 that this is the last consolidated CDR for the session. For example, charging gateway system 122 may insert a flag or indicator in the consolidated CDR, such as "final" or "last". Charging gateway system 122 then transmits the final consolidated CDR to billing system 106 in step 308. Based on the final consolidated CDR, billing system 106 may finally resolve a bill for the session, or bill for any part of the session that was not already billed based on the interim consolidated CDRs.

Figure 4:
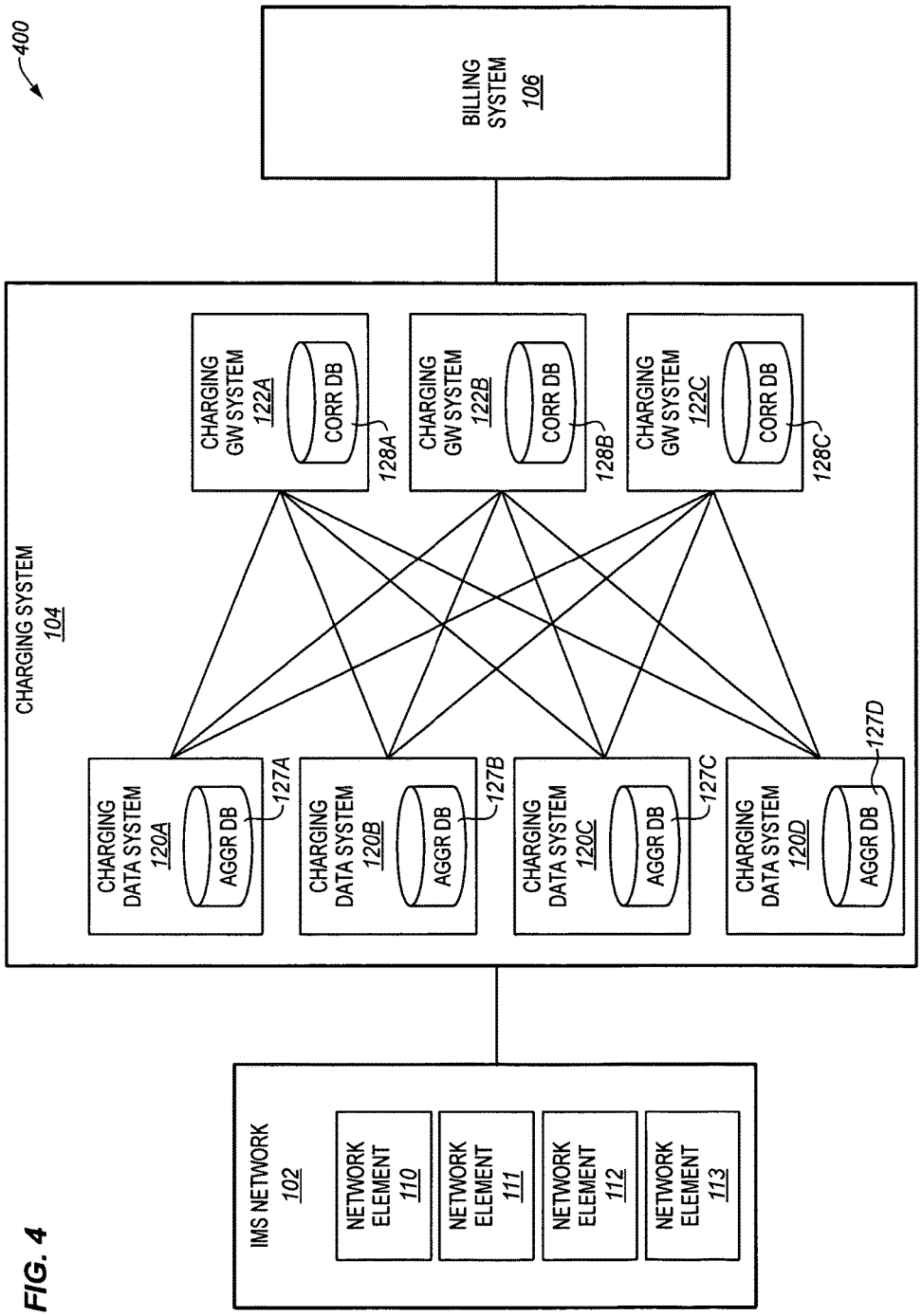
FIG. 4 illustrates another embodiment of a charging system.

FIG. 4 illustrates another embodiment of charging system 104. In this embodiment, charging system 104 includes a plurality of charging data systems 120A-D configured in a cluster. Similarly, charging system 104 includes a plurality of charging gateway systems 122A-C. Charging data systems 120 and charging gateway systems 122 are implemented in clusters to add geo-redundancy. Each charging data system 120A-D includes a local aggregation database 127A-D. Each charging gateway system 122A-C includes a local correlation database 128A-D.

Because multiple charging data systems 120 in FIG. 4 may receive accounting messages from network elements 110-113 in IMS network 102, it is desirable to synchronize when the multiple charging data systems 120 perform aggregation. Thus, when one charging data system 120A sets the aggregation/correlation timer, that charging data system 120A distributes the aggregation/correlation timer to other charging data systems 120B-D in the cluster. That way, the other charging data systems 120B-D are able to aggregate partial CDRs for the session concurrently, and transmit the aggregated partial CDRs to a charging gateway system 122A-C for correlation.

Assume for one example that the partial CDR timer is set to 15 minutes and the aggregation/correlation timer is set to 6 hours within charging system 104 of FIG. 4. For a session in IMS network 102 that lasts for 8 hours, the network elements 110-113 that serve the session transmit accounting messages to charging data system 120A. For example, one of the network elements 110-113 sends a start accounting message to charging data system 120A. In response to the start accounting message, charging data system 120A starts the aggregation/correlation timer and the partial CDR timer. Charging data system 120A then distributes the aggregation/correlation timer to the other charging data systems 120B-D in the cluster. Charging data system 120A also opens a CDR for the network element.

At the 15 minute expiration of the partial CDR timer, charging data system 120A closes the CDR to generate a partial CDR, and stores the partial CDR in aggregation database 127A. Charging data system 120A then opens a new CDR, and continues to generate partial CDRs upon expiration of the partial CDR timer. This process of generating partial CDRs occurs for each network element 110-113 that transmits accounting messages to charging data system 120A. Other charging data systems 120B-D may operate in a similar manner to generate partial CDRs.

Charging data system 120A also monitors the aggregation/correlation timer. When the duration of the session has reached six hours (i.e., expiration of the aggregation/correlation timer), charging data system 120A initiates aggregation of the partial CDRs for each network element that are stored in aggregation database 127A. Charging data system 120A then transmits the aggregated partial CDRs (and any full CDRs) to charging gateway system 122A. Other charging data systems 120B-D may aggregate the partial CDRs for each network element upon expiration of the aggregation/correlation timer, and transmit additional aggregated partial CDRs to charging gateway system 122A.

Charging gateway system 122A receives the aggregated partial CDRs and full CDRs from charging data systems 120A-D, and stores the CDRs in correlation database 128A. At some point, charging gateway system 122A initiates correlation of the CDRs for the session that are stored in correlation database 128A. Charging gateway system 122A may monitor the aggregation/correlation timer, and initiate correlation after a threshold time period following expiration of the aggregation/correlation timer. The delay after expiration of the aggregation/correlation timer is to ensure that charging gateway system 122A receives all of the CDRs. For example, charging gateway system 122A may wait two minutes after expiration of the aggregation/correlation timer before initiating correlation. In correlating the CDRs, charging gateway system 122A generates an interim consolidated CDR that includes charging information for the first 6 hours of the session. Charging gateway system 122A then transmits the interim consolidated CDR to billing system 106. Billing system 106 may then bill for the first 6 hours of the session based on the interim consolidated CDR.

Charging data system 120A also opens a new CDR for each network element 110-113, and continues to periodically generate partial CDRs in response to the expiration of the partial CDR timer. When the session comes to an end at the 8 hour point, charging data system 120A again initiates aggregation of the partial CDRs for each network element, and transmits the aggregated partial CDRs (and any full CDRs) to charging gateway system 122A. Charging gateway system 122A then initiates correlation of the CDRs for the session. Charging gateway system 122A thus generates a final consolidated CDR that includes charging information for the last 2 hours of the session, and transmits the final consolidated CDR to billing system 106. Billing system 106 may then bill for the last 2 hours of the session based on the final consolidated CDR.

As in evident in the above example, because aggregation and correlation is triggered during the session as opposed to only at the end of the session, interim consolidated CDRs may be provided to billing system 106. Advantageously, billing system 106 can bill for part of the session. It does not matter whether a session lasts for days or weeks, as periodic billing for the session may be performed based on the interim consolidated CDRs.

Although specific embodiments were described herein, the scope of the invention is not limited to those specific embodiments. The scope of the invention is defined by the following claims and any equivalents thereof.

We claim:

1. A charging system operable to provide interim billing for sessions in an IP Multimedia Subsystem (IMS) network, the charging system comprising:
    a charging data system operable to receive accounting messages from network elements serving the session in the IMS network, to generate partial Charging Data Records (CDR) for each network element based on the accounting messages, and to set a timer that triggers aggregation of the partial CDRs during the session after the session exceeds a time period;
    the charging data system further operable to monitor the timer;
    responsive to the timer expiring, the charging data system is further operable to aggregate the partial CDRs for each network element during the session to generate an aggregated CDR for each network element.

2. The charging system of claim 1 further comprising:
    a charging gateway system operable to receive the aggregated CDRs for each network element from the charging data system, to correlate the aggregated CDRs to generate an interim consolidated CDR for the session further responsive to the timer expiring, and to transmit the interim consolidated CDR to a billing system to allow for billing for part of the session before the session ends.

3. The charging system of claim 2 wherein:
    the charging gateway system is further operable to insert an interim indicator in the interim consolidated CDR to indicate to the billing system that there will be additional consolidated CDRs for the session.

4. The charging system of claim 2 wherein:
    the charging data system is further operable to reset the timer.

5. The charging system of claim 4 wherein:
    the charging data system is further operable to identify the end of the session before the next expiration of the timer, and to aggregate the partial CDRs for each network element to generate another aggregated CDR for each network element responsive to the end of the session.

6. The charging system of claim 5 wherein:
    the charging gateway system is further operable to receive the other aggregated CDR for each network element from the charging data system, to correlate the other aggregated CDRs to generate a final consolidated CDR for the session responsive to the end of the session, and to transmit the final consolidated CDR to the billing system.

7. The charging system of claim 6 wherein:
    the charging gateway system is further operable to insert a final indicator in the final consolidated CDR to indicate to the billing system that this is the last consolidated CDR for the session.

8. The charging system of claim 1 wherein:
    the charging data system is part of a cluster of charging data systems; and
    the charging data system is further operable to distribute the timer to other charging data systems in the cluster so that the other charging data systems aggregate partial CDRs from other network elements serving the session concurrently, and to transmit the aggregated partial CDRs to the charging gateway system for correlation.

9. A method of providing interim billing for sessions in an IP Multimedia Subsystem (IMS) network, the method comprising:
    receiving accounting messages from network elements serving the session in the IMS network;
    generating partial Charging Data Records (CDR) for each network element based on the accounting messages;
    setting a timer that triggers aggregation of the partial CDRs during the session after the session exceeds a time period;
    monitoring the timer; and
    responsive to the timer expiring, aggregating the partial CDRs for each network element during the session to generate an aggregated CDR for each network element.

10. The method of claim 9 further comprising:
    correlating the aggregated CDRs to generate an interim consolidated CDR for the session further responsive to the timer expiring; and
    transmitting the interim consolidated CDR to a billing system to allow for billing for part of the session before the session ends.

11. The method of claim 10 further comprising:
    inserting an interim indicator in the interim consolidated CDR to indicate to the billing system that there will be additional consolidated CDRs for the session.

12. The method of claim 10 further comprising:
    resetting the timer.

13. The method of claim 12 further comprising:
    identifying the end of the session before the next expiration of the timer; and
    aggregating the partial CDRs for each network element to generate another aggregated CDR for each network element responsive to the end of the session.

14. The method of claim 13 further comprising:
    correlating the other aggregated CDRs to generate a final consolidated CDR for the session responsive to the end of the session; and
    transmitting the final consolidated CDR to the billing system.

15. The method of claim 14 further comprising:
    inserting a final indicator in the final consolidated CDR to indicate to the billing system that this is the last consolidated CDR for the session.

16. A communication network, comprising:
    an IP Multimedia Subsystem (IMS) network having a plurality of network elements operable to serve a session; and
    a charging system operable to receive accounting messages from the network elements, and to generate partial Charging Data Records (CDR) for each network element based on the accounting messages;

the charging system is further operable to aggregate the partial CDRs for each network element before the end of the session to generate an aggregated CDR for each network element.

17. The communication network of claim 16 wherein:

a charging system is further operable to correlate the aggregated CDRs before the end of the session to generate an interim consolidated CDR for the session, and to transmit the interim consolidated CDR to a billing system to allow for billing for part of the session before the session ends.

18. The communication network of claim 17 wherein:

the charging system is further operable to aggregate the partial CDRs responsive to an expiration of a timer.

19. The communication network of claim 17 wherein:

the charging system is further operable to identify the end of the session, and to aggregate the partial CDRs for each network element to generate another aggregated CDR for each network element responsive to the end of the session.

20. The communication network of claim 19 wherein:

the charging system is further operable to correlate the other aggregated CDRs to generate a final consolidated CDR for the session responsive to the end of the session, and to transmit the final consolidated CDR to the billing system.

\* \* \* \* \*